United States Patent
Jones (10) Patent No.: US 8,971,802 B2
(45) Date of Patent: Mar. 3, 2015

(54) NEAR FIELD COMMUNICATION APPARATUS

(71) Applicant: Steve Jones, Milton Keynes (GB)

(72) Inventor: Steve Jones, Milton Keynes (GB)

(73) Assignee: Cambridge Silicon Radio Limited, Cambridge (GB)

(*) Notice: Subject to any disclaimer, the term of this patent is extended or adjusted under 35 U.S.C. 154(b) by 237 days.

(21) Appl. No.: 13/734,849

(22) Filed: Jan. 4, 2013

(65) Prior Publication Data

US 2014/0194055 A1    Jul. 10, 2014

(51) Int. Cl.
*H04B 5/00* (2006.01)
*H04W 52/02* (2009.01)
*H04W 4/00* (2009.01)

(52) U.S. Cl.
CPC ............ *H04B 5/0056* (2013.01); *H04B 5/0025* (2013.01); *H04W 52/0254* (2013.01); *H04W 4/008* (2013.01)
USPC ...... 455/41.1; 340/10.1; 340/572.4; 235/439; 235/441; 235/451; 704/222; 704/230

(58) Field of Classification Search
CPC .... H04B 5/0056; H04B 5/025; H04B 5/0075; H04W 4/008; H04W 52/0254
USPC ......... 455/41.1, 41.2, 504, 343.5, 193.1, 205, 455/263
See application file for complete search history.

(56) References Cited

U.S. PATENT DOCUMENTS

| | | | |
|---|---|---|---|
| 4,356,477 A | 10/1982 | Vandebult | |
| 7,881,665 B2 * | 2/2011 | Symons | 455/41.1 |
| 7,926,719 B2 * | 4/2011 | Spiess et al. | 235/439 |
| 7,975,921 B2 * | 7/2011 | Mani et al. | 235/441 |
| 7,986,916 B2 * | 7/2011 | Williams | 455/41.1 |
| 8,169,185 B2 * | 5/2012 | Partovi et al. | 320/108 |
| 8,285,211 B2 * | 10/2012 | Wang et al. | 455/41.2 |
| 8,358,596 B2 * | 1/2013 | Byrne et al. | 370/255 |
| 8,588,330 B2 * | 11/2013 | Muhammad | 375/295 |
| 8,594,233 B2 * | 11/2013 | Muhammad | 375/298 |
| 8,730,845 B2 * | 5/2014 | Byrne et al. | 370/255 |
| 8,787,830 B2 * | 7/2014 | Moosavi et al. | 455/41.1 |
| 2012/0248891 A1 | 10/2012 | Drennen | |

OTHER PUBLICATIONS

Search Report issued May 1, 2014 in corresponding GB1311957.3.

* cited by examiner

*Primary Examiner* — Marceau Milord
(74) *Attorney, Agent, or Firm* — Pillsbury Winthrop Shaw Pittman LLP (57) ABSTRACT

A system for use in a near field communications (NFC) reader, for detecting the presence of an NFC tag, is disclosed. The NFC reader has an antenna tuned to a resonant frequency. The system comprises: a first signal generator for generating a carrier signal whose frequency varies about the resonant frequency; a second signal generator for generating a modulating signal for modulating the carrier signal; a modulator for modulating the carrier signal with the modulating signal; a driver for driving the antenna with the modulated signal; and a detection system for detecting harmonics of the modulating signal in a signal present in the antenna as a result of the modulated signal. The detector is configured to generate an output when a third or higher order harmonic is detected.

12 Claims, 6 Drawing Sheets

NEAR FIELD COMMUNICATION APPARATUS

TECHNICAL FIELD

The present invention relates to a near field communications (NFC) apparatus, and to a method for detecting a near field communications device.

BACKGROUND TO THE INVENTION

Near field communications (NFC) devices are becoming increasingly popular, in sectors such as banking, as they permit rapid exchange of data over a short range (less than 10 cm), which can be used to facilitate making small value payments, for example.

In recent times, interest in incorporating active NFC devices such as NFC readers in small portable devices such as mobile telephones has grown.

At present, in order to perform an NFC transaction, an active NFC device such as an NFC reader must generate a magnetic field with which DC power can be delivered to a receiving NFC device, which may be a passive NFC device such as a tag. The current required to generate such a magnetic field around an antenna of the active NFC device may be as high as 100-200 mA, and this type of operation, which is known as Reader Emulation Mode (REM), may need to be continued for an extended period of time in a search mode in which the active NFC device tries to identify a compatible NFC device with which to perform a data transaction.

When REM is used by an active NFC device such as a reader to search for compatible NFC devices, a signal modulated with data is transmitted by the reader, which awaits a reply. When a reply is received, a data transaction can take place between the active reader and the replying device. It will be appreciated that this process of searching for compatible devices can occupy a high proportion of the operating time of the NFC device and thus consumes a considerable amount of power, which is undesirable in portable devices such as mobile telephones which have limited battery resources.

SUMMARY OF INVENTION

According to a first aspect of the present invention there is provided a system for use in a near field communications (NFC) reader for detecting the presence of an. NFC tag, the NFC reader having an antenna tuned to a resonant frequency, the system comprising: a first signal generator for generating a carrier signal whose frequency varies about the resonant frequency; a second signal generator for generating a modulating signal for modulating the carrier signal; a modulator for modulating the carrier signal with the modulating signal; a driver for driving the antenna with the modulated signal; and a detection system for detecting harmonics of the modulating signal in a signal present in the antenna as a result of the modulated signal; wherein the detection system is configured to generate an output when a third or higher order harmonic is detected.

The frequency of the carrier signal may vary from around 3.5 MHz below the resonant frequency to around 3.5 MHz above the resonant frequency.

The output may comprise a signal to activate the NFC reader.

The detection system may be configured to detect a signal representative of an input impedance of the antenna. The detected signal may be a voltage. The detection system may comprise a detector and a filter. The detector may comprise a voltage detector and the filter may comprise a band-pass filter.

The system may further comprise a comparator for comparing a voltage output from the detection system with a predetermined threshold voltage.

According to a second aspect of the present invention there is provided a method for use in a near field communications (NFC) reader for detecting the presence of an NFC tag, the NFC reader having an antenna tuned to a resonant frequency, the method comprising: generating a carrier signal whose frequency varies about the resonant frequency; generating a modulating signal for modulating the carrier signal; modulating the carrier signal with the modulating signal; driving the antenna with the modulated signal; detecting harmonics of the modulating signal in a signal present in the antenna as a result of the modulated signal; and generating an output when a third or higher order harmonic is detected.

Generating an output may comprise activating the NFC reader. The frequency of the carrier signal may vary from around 3.5 MHz below the resonant frequency to around 3.5 MHz above the resonant frequency.

BRIEF DESCRIPTION OF THE DRAWINGS

Embodiments of the invention will now be described, strictly by way of example only, with reference to the accompanying drawings, of which.

DESCRIPTION OF THE EMBODIMENTS

Figure 1:
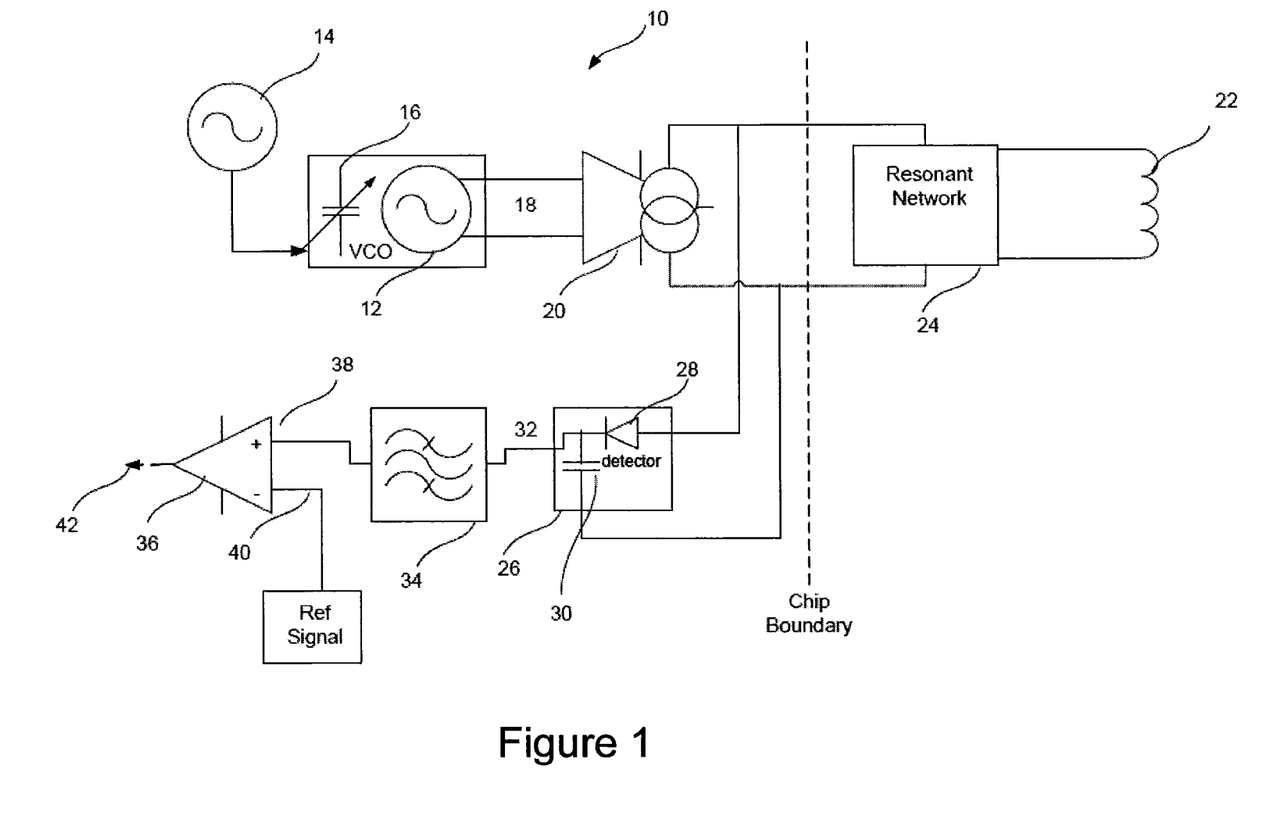
FIG. 1 is a schematic representation of a model of an NFC reader.

Referring to FIG. 1, a model of an NFC reader is shown, schematically, generally at 10. It will be appreciated that the functional blocks shown in FIG. 1 are for illustrative purposes only, and do not necessarily represent actual components of an NFC reader.

The NFC reader 10 includes a first signal source 12 which, in this embodiment, is a signal generator, configured to generate a carrier signal. The signal generator is configured to generate a signal whose frequency varies as a function of a control voltage (known as a voltage controlled oscillator (VCO)). For example, the carrier frequency may be centred on a frequency of 13.56 MHz (which is a typical NFC carrier frequency) and vary by ±3.5 MHz. In other words, the frequency of the carrier signal has a peak deviation of approximately 3.5 MHz and, therefore, varies between around 10 MHz and around 17 MHz. It will be appreciated that, in other embodiments, other frequency bands may be used. A second signal source 14 which, in this embodiment is a signal generator, is configured to generate a modulating signal which, in this embodiment, has a constant frequency of around 100 kHz. Block 16 performs a frequency modulator function which serves to modulate the carrier signal with the modulating signal, and outputs a frequency modulated (FM) signal at output 18. The modulated signal is fed into a driver 20, which is configured to drive an antenna 22 with a current via a resonant network 24. As will be appreciated by those skilled in the art, the resonant network 24 may take many different forms, but will include one or more electrical components used to tune the resonant frequency of the circuit to a desired frequency (in this case, 13.56 MHz). In this embodiment, the driver 20 drives the antenna 22 with a current. Alternatively, however, the antenna 22 could be driven with a voltage. In normal operation, the flow of a current through the antenna 22 causes the antenna to generate a magnetic field, which is capable of coupling to an antenna of an NFC tag (not shown).

A voltage detector 26 is coupled to the antenna 22 via the resonant network 24, and is configured to measure a voltage across the antenna. The measured voltage is representative of an input impedance of the antenna 22. In this embodiment, the voltage detector is a diode detector of known type, and is formed of a diode 28 and a capacitor 30. However, it will be appreciated that other means for measuring the voltage across the antenna 22 could be used.

The detector 26 also serves to demodulate the modulated signal received at the antenna 22. The demodulation allows the modulating signal to be recovered from the signal received at the antenna 22. The demodulated signal is output at 32 from the detector 26, and is fed through a band-pass filter 34, which is configured to filter out signals falling outside a desired frequency band. The band-pass filter 34 is configured set at a frequency around a fourth harmonic of the modulating signal frequency, 100 kHz. That is to say, the band-pass filter 34 is configured to filter out any signals having frequencies falling outside a band centred around 400 kHz (4×100 kHz). A filtered signal output from the band-pass filter 34 is fed into a comparator 36. In this embodiment, the comparator 36 is an operational amplifier having a non-inverting input 38 and an inverting input 40. The filtered signal is fed into the non-inverting input 38 of the operational amplifier 36, and compared against a reference signal which is fed into the inverting input 40 of the operational amplifier. Based on the comparison, the comparator 36 outputs an instruction signal 42, which will be discussed below.

A dashed line indicates a boundary of a printed circuit board or chip in which a part of the NFC reader 10 is embodied. The components to the left of the dashed line are typically installed on a chip. The antenna 22 is typically connected to the resonant network 24, and the chip is connected to the resonant network in a known manner.

Figure 2:
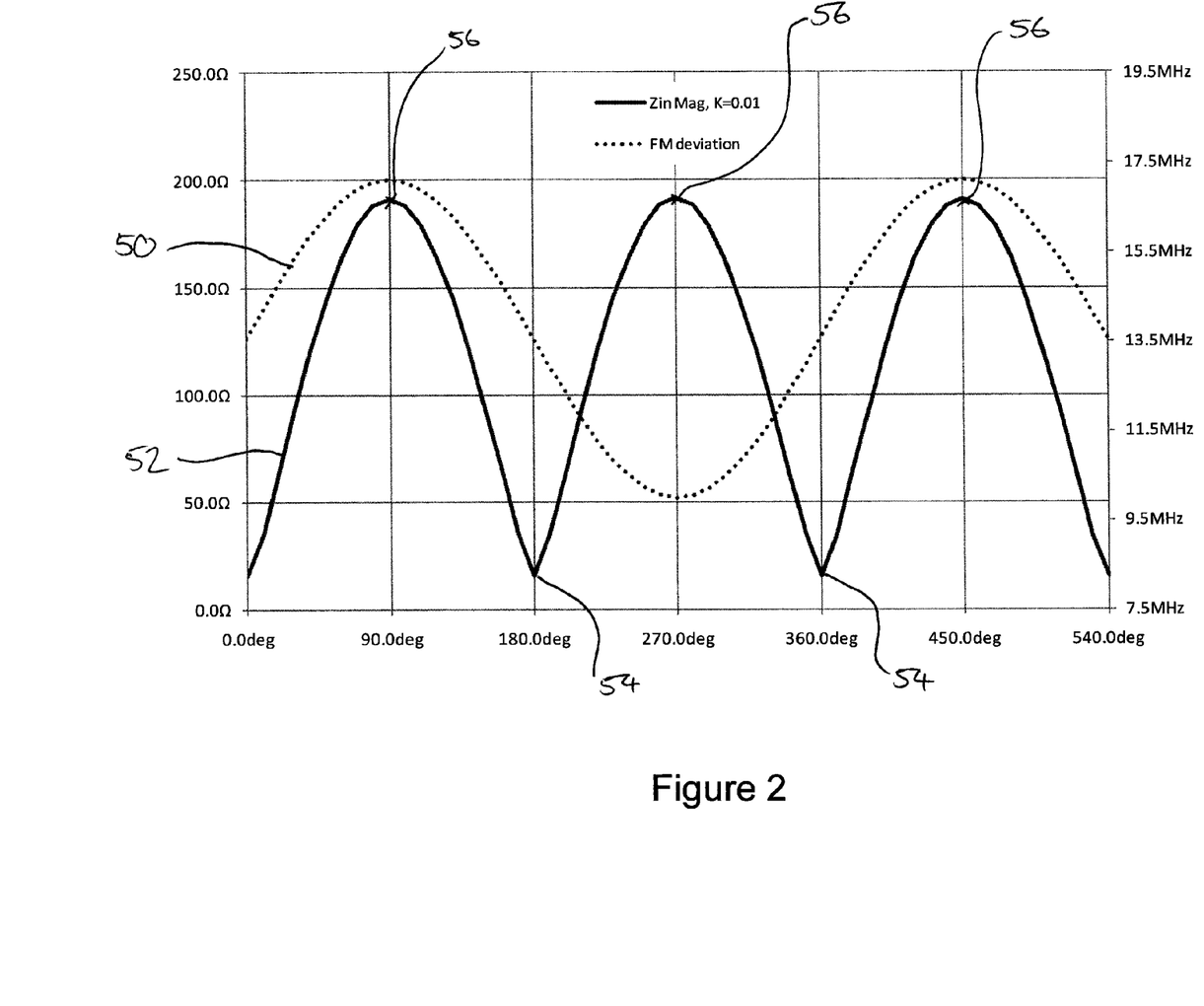
FIG. 2 is a plot showing an input impedance of an NFC antenna when no NFC tag is present.

In use, the modulated signal 18 is emitted from the antenna 22. The emitted signal has a frequency based on that of the carrier signal. In this embodiment, therefore, the frequency of the emitted signal varies by approximately ±3.5 MHz about a frequency of 13.56 MHz. The antenna 22 has an input impedance that depends upon the frequency of the modulated signal driving it. FIG. 2 shows the input impedance of the antenna 22 at different frequencies, when the antenna is in isolation (i.e. when no NFC tag is near enough to the antenna of the NFC reader 10 to be detected). The variation in frequency of the frequency modulated signal is shown by dashed line 50. In the embodiment in which the modulating signal frequency is 100 kHz, each of the 90-degree phase increments along the x-axis shown in FIG. 2 corresponds to a 2.5 μsec time increment.

The input impedance of the antenna 22 is shown by line 52. At the resonant frequency of 13.56 MHz, the impedance of the antenna 22 is at a minimum, as shown by points 54. At frequencies above and below the resonant frequency, the impedance of the antenna 22 increases, and is a maximum when the deviation of the frequency of the carrier signal from the resonant frequency is at a maximum, as shown by points 56. The dominant signal at the output 32 of the detector 26 in the embodiment shown in FIG. 1 has a frequency of 200 kHz (2×100 kHz) which is representative of the second harmonic of the modulating signal.

Figure 3:
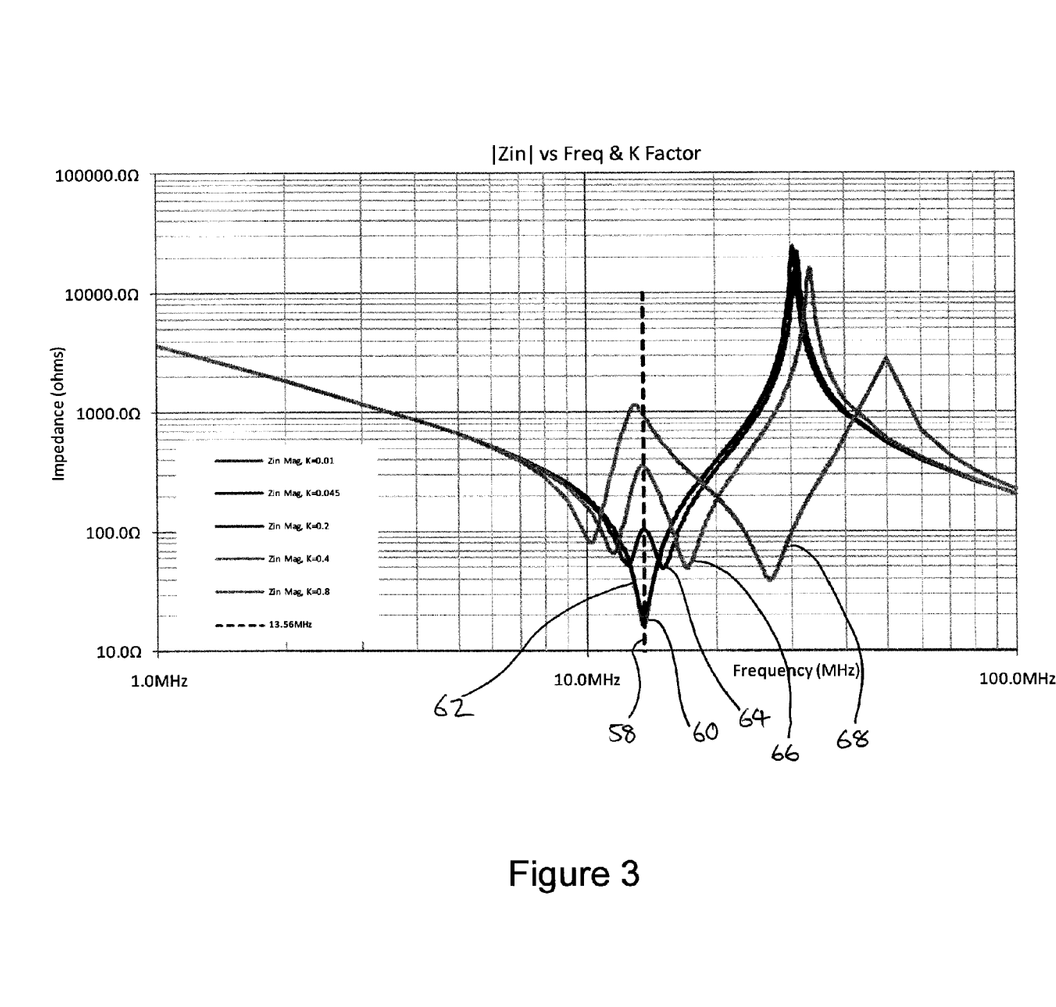
FIG. 3 is a plot showing an input impedance of an NFC antenna as a function of frequency and the coupling factor between and NFC reader and a target when the target is a passive NFC tag.

When an NFC tag is present in the magnetic field generated by the antenna 22 as a result of the driving current, the input impedance of the antenna 22 changes. The input impedance varies as the distance between the NFC reader and the NFC tag varies. In other words, the input impedance of the antenna 22 changes as a function of the coupling factor k between the NFC reader and the NFC tag, where k increases as the distance between the reader and the tag decreases. FIG. 3 shows the variation of the input impedance of the antenna as a function of frequency for various coupling factors, in the scenario where an NFC tag is present within a detectable range of the NFC reader.

In FIG. 3, the resonant frequency 13.56 MHz is shown by a vertical dashed line 58. Line 60 shows the antenna input impedance as a function of frequency for a reader-tag coupling having a coupling factor, k=0.01. Such a relatively low coupling factor represents a relatively large distance between the reader and the tag and, consequently, the presence of a tag at this distance has little effect on the input impedance in the antenna 22. Line 62 shows the antenna input impedance as a function of frequency for a reader-tag coupling having a coupling factor, k=0.045. At the resonant frequency, the input impedance is increased slightly with respect to the case in which k=0.01. Line 64 shows the antenna input impedance as a function of frequency for a reader-tag coupling having a coupling factor, k=0.2. From line 64, it is clear that the input impedance at the resonant frequency is significantly increased compared to the impedance when k=0.01 or when k=0.045. Furthermore, the line 64 exhibits minimum impedances at frequencies either side of the resonant frequency. Similarly, line 66, which shows the antenna impedance as a function of frequency for a reader-tag coupling having a coupling factor, k=0.4, and line 68, which shows the antenna impedance as a function of frequency for a reader-tag coupling having a coupling factor, k=0.8, also have minima either side of the resonant frequency. The impedance at the resonant frequency increases as k increases.

Figure 4:
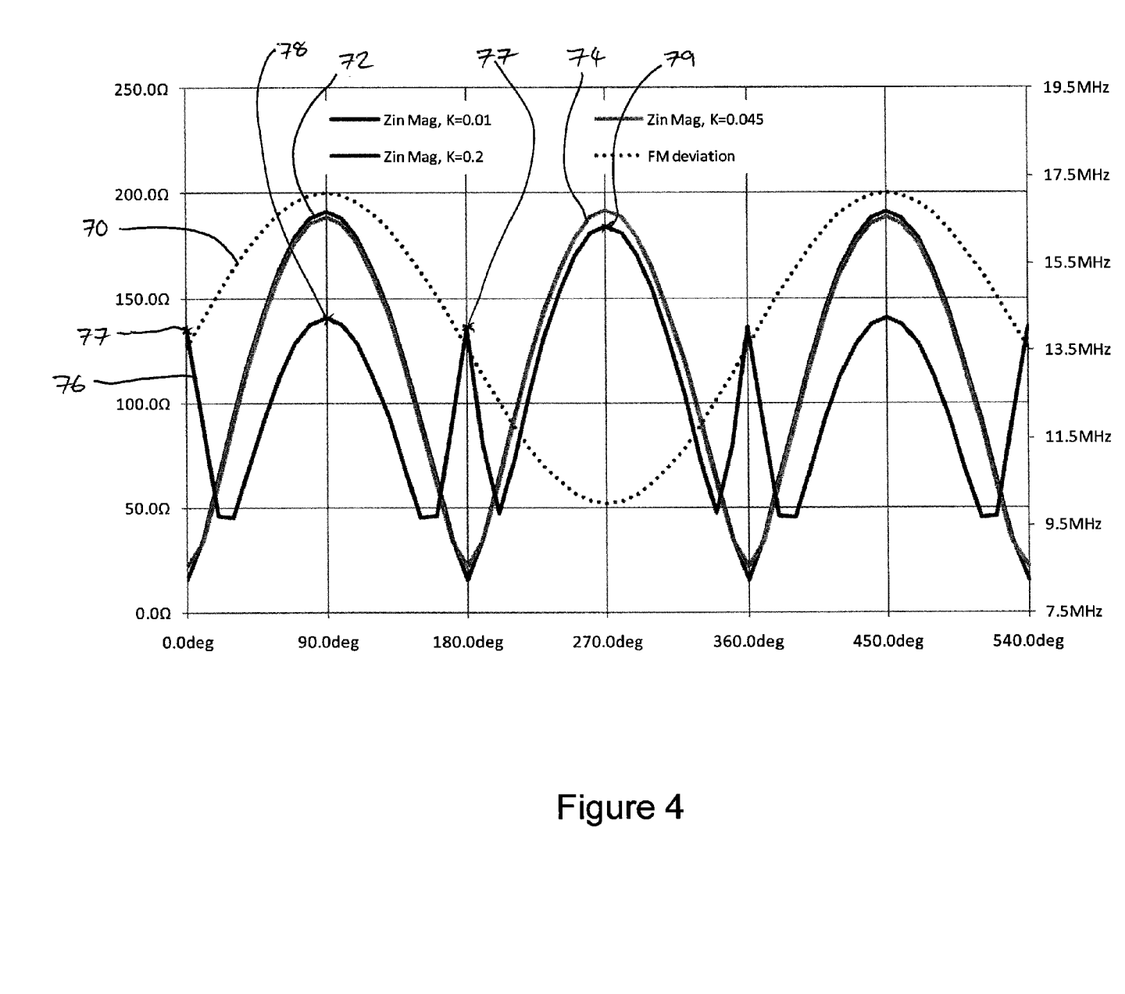
FIG. 4 is a plot showing an input impedance of an NFC antenna when a passive NFC tag is detected.

FIG. 4 shows the input impedance of the antenna 22 as the frequency of the carrier signal varies, when an NFC tag is near enough to the antenna of the NFC reader to be detected. The variation in frequency of the frequency modulated signal is shown by dashed line 70. The input impedance of the antenna 22 as the carrier frequency changes for various tag-reader coupling factors is shown by lines 72, 74 and 76. Line 72 shows the input impedance of the antenna 22 as a function of frequency for a reader-tag coupling having a coupling factor, k=0.01. A relatively low coupling factor of k=0.01 represents a large distance between the tag and the reader. Thus, the presence of a tag at such a large distance has little or no measurable effect on the input impedance of the antenna 22. It will be noted that the line 72 is identical to the line 50 in FIG. 2 which also represents the input impedance of the antenna 22 with a coupling factor k=0.01; representative of a low level of tag-reader coupling.

Line 74 shows the input impedance of the antenna 22 as a function of frequency for a reader-tag coupling having a coupling factor, k=0.045. As is evident from FIG. 3, at the resonant frequency, 13.56 MHz, the input impedance at this coupling factor is slightly greater than the impedance when k=0.01. When the carrier signal is at its peak deviation above the resonant frequency, the input impedance of the antenna 22 at k=0.045 (line 74) is slightly lower than the impedance when k=0.01 (line 72). However, when the carrier signal is at its peak deviation below the resonant frequency, the input impedance of the antenna 22 when k=0.045 (line 74) is slightly higher than the impedance when k=0.01 (line 72).

Line 76 shows the input impedance of the antenna 22 as a function of frequency for a reader-tag coupling having a coupling factor, k=0.2. This coupling factor represents a relatively small distance between the tag and the reader and, as is visible in FIG. 4, when the carrier signal is at the resonant frequency, the input impedance when k=0.2 is significantly greater than the impedance when k=0.01 or 0.045. When k=0.2, peaks in the input impedance occur when the modulated signal 70 is at a frequency around the resonant frequency (that is around 13.56 MHz) shown by points 77, when the modulated signal 70 is at a frequency of around 17 MHz, shown by point 78, and when the modulated signal 70 is at a frequency of around 9.5 MHz, shown by point 79. Thus, for one complete cycle of the modulated signal (line 70), the presence of an NFC tag causes the input impedance of the antenna 22 to peak four times. As is evident from the plots in FIG. 4, a strong fourth harmonic component of the modulating signal (100 KHz) exists when the coupling between the reader and the tag exceeds a critical value which, in this embodiment, is when k=0.045. Such a response is indicative of the fourth harmonic of the modulating signal and, therefore, detection of the fourth harmonic of the modulating signal can be indicative of the presence of an NFC tag near to the reader 10.

As is mentioned above, the voltage detector 26 detects the voltage across the antenna 22, and feeds an output 32 through the band-pass filter 34. The band-pass filter 34 can be configured automatically or manually to selectively filter out signals having a frequency falling outside of a predetermined range. In one embodiment, the band-pass filter 34 is configured to filter signals having a frequency falling outside a range centred around the fourth harmonic of the modulating frequency (around 400 kHz [=4×100 kHz]). In other words, if the frequency of the signal output by the voltage detector 26 is around 400 kHz, then the band-pass filter 34 outputs a signal to the comparator 36. However, if the frequency of the signal output by the voltage detector 26 is outside the pass-band of the filter 34, then the filter does not output any signal to the comparator, or the signal is attenuated so that its amplitude is negligible.

As the distance between the tag and the reader becomes very small (that is, as the coupling factor k increases beyond around k=0.5), the fourth harmonic is suppressed, making its detection more difficult. The fourth harmonic starts to become apparent as the coupling factor increases beyond around k=0.045, and is most prominent when the coupling between the tag and the reader is such that k is between around 0.1 and 0.4.

In some embodiments, a voltage across the antenna 22 can be seen to vary three times as quickly as the frequency of the modulating signal. Such a response is indicative of the third harmonic of the modulating signal, and detection of the third harmonic of the modulating signal can also be indicative of the presence of an NFC tag near to the reader 10. It should be noted that, as the coupling between a tag and the reader becomes stronger, such that the coupling factor increases, the third harmonic becomes more prominent. In some embodiments, where detection of the third harmonic can signify the presence of a NFC tag near to the reader 10, it may not be necessary to detect the fourth harmonic.

It will be appreciated that, even if an NFC tag is not present near to the NFC reader, the presence of a metallic object in a field emitted by the reader might affect the impedance of the antenna 22. However, the present invention enables a distinction to be made between the detection near to the reader of an NFC tag and metallic object which is not an NFC tag.

Figure 5:
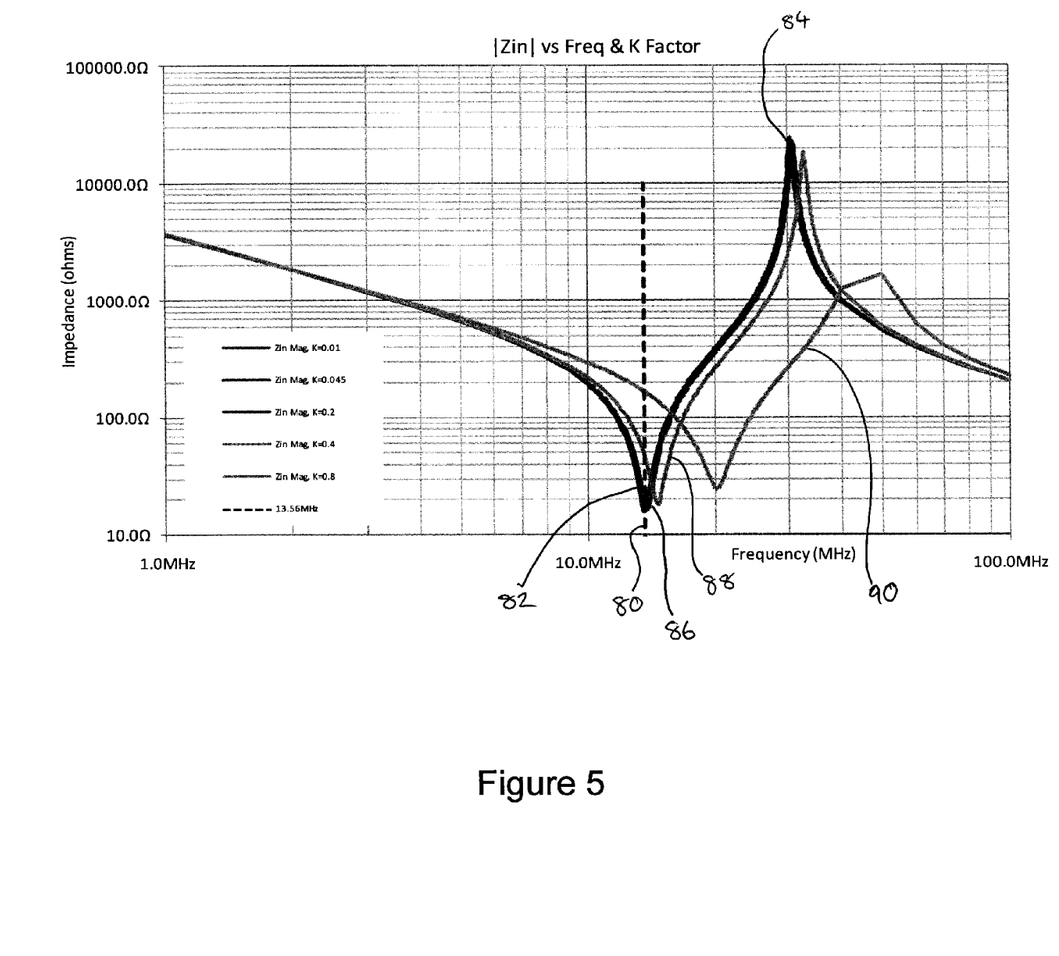
FIG. 5 is a plot showing an input impedance of an NFC antenna as a function of frequency and the coupling factor between and NFC reader and a target when the target is a metallic plate.

FIG. 5 shows the variation of impedance of the antenna as a function of frequency for various coupling factors, in the scenario where a metallic plate is present within a detectable range of the NFC reader, but where the metallic plate is not an NFC target. A dashed line 80 denotes the resonant frequency, 13.56 MHz. Lines 82 and 84 show the antenna impedance as a function of frequency for reader-metallic plate couplings having coupling factors, k=0.01 and k=0.045 respectively. The two lines 82, 84 are almost identical, and are indistinguishable from one another in the plot shown in FIG. 5. Line 86 shows the antenna impedance as a function of frequency for reader-metallic plate coupling having a coupling factor, k=0.2. The impedance varies with frequency in a manner very similar to that for coupling factors k=0.01 and k=0.045. When the coupling factor, k=0.2 (line 86), the impedance minimum occurs at a frequency slightly greater than the resonant frequency, 13.56 MHz, and an impedance maximum occurs at a frequency slightly greater than the maxima which occur when k=0.01 and k=0.045. A similar trend is seen when the distance between the NFC reader and the metallic plate is reduced (that is, when the coupling factor k is increased). Line 88 shows the antenna impedance when k=0.4. Line 90 shows the antenna impedance as a function of frequency for reader-metallic plate coupling having a coupling factor, k=0.8. When the reader-metallic plate coupling is this strong (k=0.8), an impedance minimum occurs at a frequency significantly greater than the resonant frequency, and an impedance maximum occurs at a frequency significantly greater than the maxima occurring when k≤0.4.

It will be noted that, while frequencies at which the minima and maxima of the impedances vary as the coupling factor changes, the impedance at the resonant frequency does not significantly increase, and none of the plots exhibits a pair of minima above and below the resonant frequency, as are exhibited by the plots shown in FIG. 3.

Figure 6:
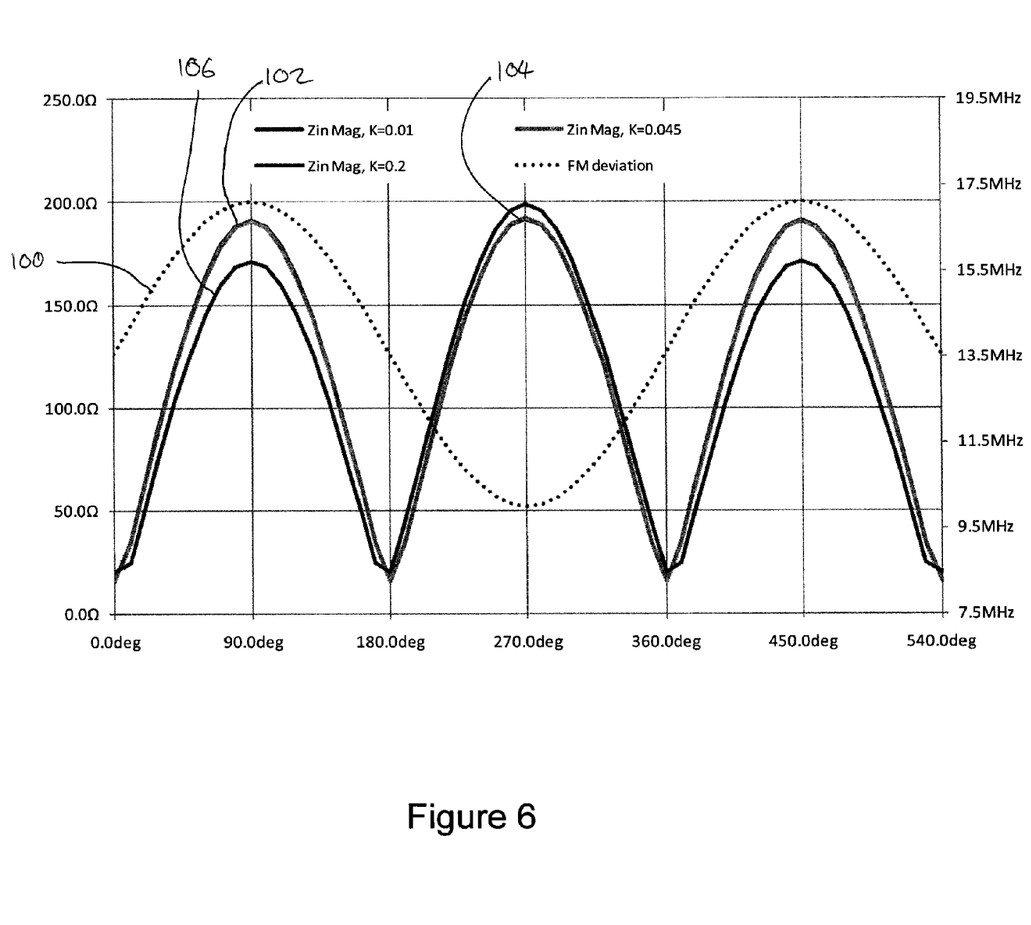
FIG. 6 is a plot showing a characteristic input impedance of an NFC antenna when a metallic plate is present near to the NFC antenna.

FIG. 6 shows the characteristic impedance of the antenna 22 at different frequencies, when a metallic plate is near enough to the antenna of the NFC reader to be detected, but in the absence of an NFC tag. The variation in frequency of the frequency modulated signal is shown by dashed line 100. The characteristic impedances of the antenna 22 for various reader-metallic plate coupling factors are shown by lines 102, 104 and 106. Line 102, 104 and 106 show the characteristic impedances of the antenna 22 as a function of frequency for reader-metallic plate couplings having coupling factors, k=0.01, k=0.045 and k=0.2 respectively. It is evident that, when k=0.2, the characteristic impedance of the antenna 22 is similar over a complete cycle of the modulated signal 100 to the characteristics impedances when k=0.01 and k=0.045. In contrast to the plot shown in FIG. 4, there are no peak impedances occurring when the modulated signal 100 is at the resonant frequency. In other words, the fourth harmonic of the modulating signal that is visible when an NFC tag is present near to the reader (FIG. 4) is not visible when the target is a metallic plate rather than an NFC tag.

Thus, the invention is able to distinguish between the detection of an NFC tag and a metallic plate which is not an NFC tag when either object is present within a detectable range of the reader. Specifically, if during the emission of the modulated signal, the detector 22 detects voltages corresponding to characteristic inductances representative of third or higher order harmonics of the modulating signal, then the system generates an output indicating that an NFC tag has been detected. The system then activates the NFC reader to operate at its full operating power, so that the reader can communicate with the detected NFC tag. The full operating power of the NFC reader is sufficient to induce a large enough current in the NFC tag to power the tag. The increased power supply to the NFC reader can be configured to last for a predetermined duration, until it is determined that the NFC tag no longer requires power from the reader, or until it is determined that the NFC tag has moved out of the detectable range of the reader. Alternatively, the increased power supply may be configured to end once the reader 10 has received a signal from the NFC tag.

An advantage of transmitting the modulated signal of varying frequency is that the input impedance of the antenna 22 over the range of frequencies of the modulated signal varies in such a way that allows a determination to be made as to whether an NFC tag is present within a detectable range of the NFC reader 10. It will be appreciated that is not necessary for the antenna 22 to emit the modulated signal constantly. Instead, the NFC reader 10 can be powered up intermittently. For example, for a 400 kHz filter, with a Q factor of Q=40, the modulated signal can be emitted for 100 μsec every 100 ms. Those skilled in the art will appreciate that alternative timing combinations could be used for filters with different Q factors, and with modulating signals of different frequencies. In this way, far less power is required than would be required if the NFC reader 10 was fully powered permanently. If, during the transmission of the modulated signal, the NFC reader 10 detects the presence of an NFC tag, then the NFC reader can be supplied with full power, enabling it to communicate with the NFC tag. The reduction in power used by the NFC reader 10 results in longer battery life of the device in which the NFC reader is installed.

So far, the invention has been described in terms of individual embodiments. However, one skilled in the art will appreciate that various embodiments of the invention, or features from one or more embodiments, may be combined as required. It will be appreciated that various modifications may be made to these embodiments without departing from the scope of the invention, which is defined by the appended claims.

What is claimed is:

1. A system for use in a near field communications (NFC) reader for detecting the presence of an NFC tag, the NFC reader having an antenna tuned to a resonant frequency, the system comprising:
   a first signal generator for generating a carrier signal whose frequency varies about the resonant frequency;
   a second signal generator for generating a modulating signal for modulating the carrier signal;
   a modulator for modulating the carrier signal with the modulating signal;
   a driver for driving the antenna with the modulated signal; and
   a detection system for detecting harmonics of the modulating signal in a signal present in the antenna as a result of the modulated signal;
   wherein the detection system is configured to generate an output when a third or higher order harmonic is detected.

2. A system according to claim 1, wherein the frequency of the carrier signal varies from around 3.5 MHz below the resonant frequency to around 3.5 MHz above the resonant frequency.

3. A system according to claim 1, wherein the output comprises a signal to activate the NFC reader.

4. A system according to claim 1, wherein the detection system is configured to detect a signal representative of an input impedance of the antenna.

5. A system according to claim 4, wherein the detected signal is a voltage.

6. A system according to claim 1, wherein the detection system comprises a detector and a filter.

7. A system according to claim 6, wherein the detection system comprises a voltage detector and the filter comprises a band-pass filter.

8. A system according to claim 1, further comprising a comparator for comparing a voltage output by the detection system with a predetermined threshold voltage.

9. A system according to claim 1, wherein the detection system is configured to generate an output when a fourth harmonic is detected.

10. A method for use in a near field communications (NFC) reader for detecting the presence of an NFC tag, the NFC reader having an antenna tuned to a resonant frequency, the method comprising:
   generating a carrier signal whose frequency varies about the resonant frequency;
   generating a modulating signal for modulating the carrier signal;
   modulating the carrier signal with the modulating signal;
   driving the antenna with the modulated signal;
   detecting harmonics of the modulating signal in a signal present in the antenna as a result of the modulated signal; and
   generating an output when a third or higher order harmonic is detected.

11. A method according to claim 10, wherein the generated output is used to activate the NFC reader.

12. A method according to claim 10, wherein the frequency of the carrier signal varies from around 3.5 MHz below the resonant frequency to around 3.5 MHz above the resonant frequency.

* * * * *

UNITED STATES PATENT AND TRADEMARK OFFICE
CERTIFICATE OF CORRECTION

| | | |
|---|---|---|
| PATENT NO. | : 8,971,802 B2 | Page 1 of 1 |
| APPLICATION NO. | : 13/734849 | |
| DATED | : March 3, 2015 | |
| INVENTOR(S) | : Jones | |

It is certified that error appears in the above-identified patent and that said Letters Patent is hereby corrected as shown below:

In the Specification

In Column 1, Line 47, delete "an." and insert -- an --, therefor.

In Column 6, Line 66, delete "detector 22" and insert -- detector 26 --, therefor.

Signed and Sealed this
Eighth Day of September, 2015

Michelle K. Lee
*Director of the United States Patent and Trademark Office*